United States Patent [19]
Wirtz

[11] 4,161,233
[45] Jul. 17, 1979

[54] PORTABLE TREE SEAT

[76] Inventor: James A. Wirtz, 1531 Shettler Rd., Muskegon, Mich. 49444

[21] Appl. No.: 858,963

[22] Filed: Dec. 9, 1977

[51] Int. Cl.² ............................................. A47C 9/10
[52] U.S. Cl. ....................................... 182/187; 108/2
[58] Field of Search ............... 182/187, 133, 134, 188; 297/332; 108/1, 2, 6, 152

[56] References Cited

U.S. PATENT DOCUMENTS

| | | | |
|---|---|---|---|
| 523,287 | 7/1894 | Kollenberg | 297/332 |
| 1,185,404 | 5/1916 | Hughes et al. | 182/187 |
| 2,842,300 | 7/1958 | Johnson | 182/133 |
| 3,340,961 | 9/1967 | Provaznik | 182/134 |
| 3,990,537 | 11/1976 | Swenson | 182/187 |

FOREIGN PATENT DOCUMENTS 641029  4/1928  France ..................................... 182/187

Primary Examiner—Reinaldo P. Machado
Attorney, Agent, or Firm—Price, Heneveld, Huizenga & Cooper

[57] ABSTRACT

A portable tree seat adapted for use with a tree or other generally vertical member is disclosed. The tree seat includes a mounting member or support bracket adapted to fit around the trunk of a tree and a seat platform. The seat platform is pivoted to the mounting member and includes a heat retaining cover on its upper surface to retain body heat. When weight is applied to the seat platform, the mounting member is torqued to a stable position.

10 Claims, 5 Drawing Figures

PORTABLE TREE SEAT

BACKGROUND OF THE INVENTION

The present invention relates to seats and more particularly, to portable seats attachable to trees and other generally vertical posts or members.

Heretofore, various forms of portable tree seats have been proposed. These seats have found popularity among hunters, campers and other sportsmen. The seats are adapted to be carried by a hunter or sportsman into the field and provide a convenient place to sit and rest or wait for long periods of time along trails for game to pass. Usually, the natural landscape does not provide suitable or comfortable places for hunters or other sportsmen to sit when in the field. This lack of suitable resting places is particularly acute during snowy weather. Also, the portable seats have been used by campers and back packers to make campsites more comfortable. The seats may provide seating space in addition to that available at developed campsites.

Examples of prior portable seat devices may be found in U.S. Pat. No. 3,340,828 to Smith et al, entitled PORTABLE SEAT and issued on Sept. 12, 1967; U.S. Pat. No. 3,730,294 to Thurman, entitled FOLDABLE READILY-TRANSPORTABLE SEAT and issued on May 1, 1973; U.S. Pat. No. 3,871,482 to Southard, entitled TREE STAND and issued on Mar. 18, 1975; and U.S. Pat. No. 3,949,835 to Butler, entitled FOLDABLE HUNTING STOOL and issued on Apr. 13, 1976.

The majority of the prior portable tree seats have employed bulky and heavy cables which wrap around a tree trunk to secure the seat to the tree. Such attachment members have increased the weight of the seat, the complexity of the seat and may cause damage to the tree bark when used. Such prior seats have not been angularly adjustable relative to the tree trunk. As a result, the seat portion will typically not be positioned horizontally relative to the ground. This reduces the comfort of the seat in use. Also, difficulties have been experienced with carrying the prior seats due to their bulk and complexity.

A need exists for a relatively simple, easily and relatively inexpensively manufactured portable seat which is compact, easily and readily carried by an individual, relatively lightweight and which provides a stable seating platform when secured to a tree.

SUMMARY OF THE INVENTION

Essentially, the portable tree seat in accordance with the present invention includes a seat platform and a bracket or mounting means for supporting the seat platform to the tree. Provision is made for permitting the seat platform to tilt or pivot relative to the bracket means so that the seat may assume a generally horizontal position relative to the ground.

In narrower aspects of the invention, a heat retaining cover is secured to the seat platform and provision is made to prevent damage to the tree on which the seat is used.

DETAILED DESCRIPTION OF THE PREFERRED EMBODIMENT

Figure 1:
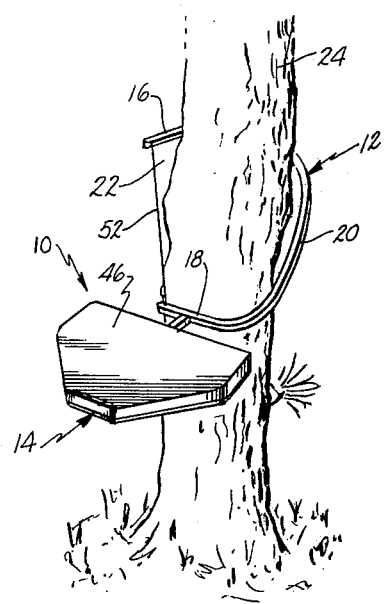
FIG. 1 is a perspective view showing the unique tree seat in accordance with the present invention attached to a tree.

The preferred embodiment of the unique portable tree seat in accordance with the presention invention is illustrated in the drawings and generally designated 10. As shown therein, a portable tree seat 10 includes a mounting bracket or locking member 12 and a seat platform structure 14 carried by the locking member 12.

Figure 4:
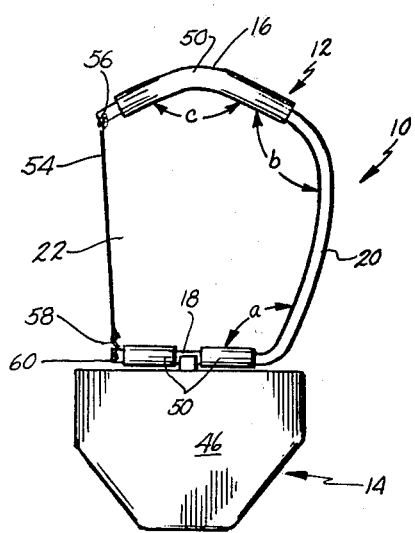
FIG. 4 is a front, elevational view of the tree seat.

As best seen in FIGS. 1 and 4, the mounting bracket or locking member 12 is generally C-shaped and includes a first portion 16, a second portion 18 and a third portion 20. In use, the first and second portions 16, 18 are spaced from each other both vertically and horizontally by the third portion 20. The mounting member 12 defines an open end or side 22 and is dimensioned to partially encircle or be positioned around a tree or other like generally vertical member 24 as shown in FIG. 1. When the locking or mounting member 12 is positioned to partially encircle the trunk 24 of a tree, portion 16 will be positioned above portion 18 and these portions will be on opposite sides of the tree trunk.

Figure 2:
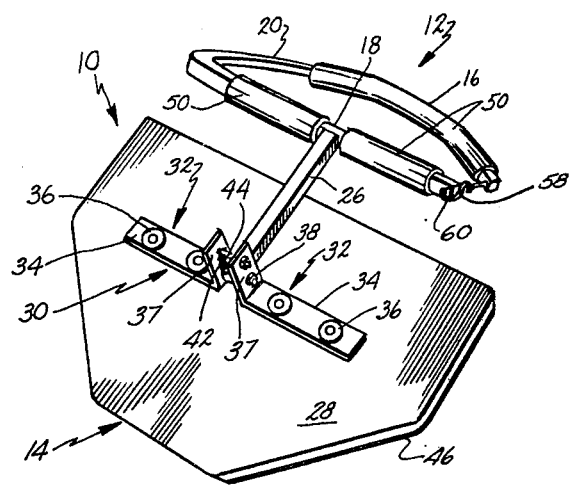
FIG. 2 is a perspective, bottom view of the tree seat.
Figure 3:
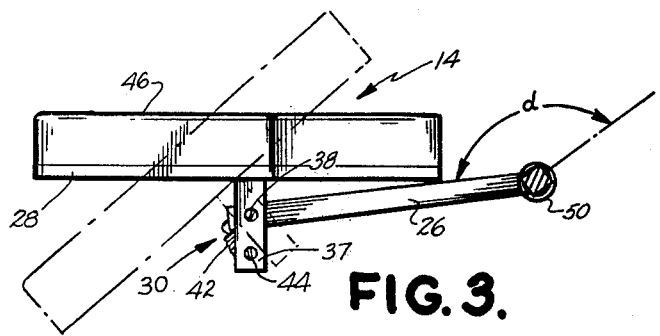
FIG. 3 is a fragmentary, side, elevational view of the tree seat.

As seen in FIGS. 2 and 3, a support member or arm 26 extends outwardly from portion 18 of the mounting bracket 12. The arm 26 is welded generally centrally of portion 18 and extends outwardly therefrom at an angle d greater than 90° relative to the bracket 12. Suspended or attached at the end of the support member 26 is a seat platform 28. The seat platform 28, preferably fabricated from plywood, is pivotally mounted in a cantilevered fashion to the free end of the support 26 by a pivot means generally designated 30. The pivot means 30 includes a pair of angled or generally L-shaped members 32 which define a pivot bracket. The members 32 each include a leg 34 secured to the undersurface of the plywood seat platform 28 by suitable fasteners such as pop rivets 36. The angle members 32 are positioned in opposed relationship so as to define a channel therebetween. A pivot pin 38 extends through leg portions 37 and through the free end of the support member 26. A suitable resilient biasing means, preferably in the form of a coil spring 42, extends from the support member 26 to a pin 44 extending between the legs 37 of the bracket members 32. The spring 42 biases the seat platform in a clockwise direction when viewed in FIG. 3 to a normal, at rest, position.

In the preferred construction, the seat 14 includes a heat retaining cover or member 46 secured to the upper surface of the platform portion 28. It is presently preferred that the heat retaining cover 46 be fabricated from styrofoam. The styrofoam material serves to absorb or retain the body heat of the user to thereby increase the comfort levels in cold weather.

In order to prevent damage to the trunk 24 of a tree, when the seat is used, protective covering 50 is positioned on portions 16 and 18. The protective covering may take the form of a resilient, rubber hose which is slipped over these portions of the mounting bracket to protect the tree bark. Also, it is presently preferred that a shock type, resilient cord 52 extends from the free ends of portions 16 and 18 of the locking member. One end 54 of the shock cord is secured at an aperture 56 to the free end of portion 16. A hook 58 is secured to the other end of the shock cord. The hook 58 is inserted within an aperture or hole 60 formed adjacent the free end of portion 18.

In use, the hook 58 on the shock cord 52 is removed from aperture 60 and the generally C-shaped mounting member 12 is slipped around the trunk of a tree. When weight is applied to the top of the seat 14, portions 16 and 18 of the locking member will torque around the tree to provide a stable attachment and in effect lock the bracket to the tree trunk. Since the seat 14 pivots or tilts relative to the support 26, it will adjust when a user sits on it so that it may assume a generally horizontal position relative to the ground. As a result, the unique portable tree seat in accordance with the present invention may be used with trees which are not vertical yet still provide a comfortable, generally horizontal seat platform for the user. Heretofore, when the prior art seats have been employed with nonvertical tree trunks or other members, they have angled either downwardly or upwardly making them uncomfortable or in some instances totally unusable. The shock cord 52, when hooked to the free end of portion 18, provides an additional measure of security to retain the bracket 12 on the tree trunk. For small diameter trees, the shock cord hook 58 may be slipped over the connecting portion 20 of the locking member.

Figure 5:
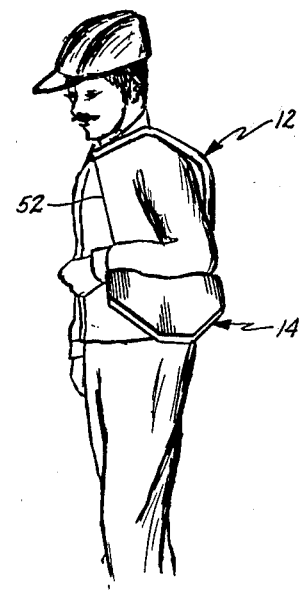
FIG. 5 is a view illustrating the manner by which the tree seat may be carried by an individual.

As seen in FIG. 5, when the user desires to carry the seat, the generally C-shaped locking member may be slipped over the user's shoulder. The member, therefore, provides an easy means for transporting the seat.

It is presently preferred that the locking member and the support 26 be fabricated from solid tubular steel rod. In a presently existing embodiment, the portion 18 assumes an angle a relative to the portion 20 of approximately 95°. The portion 16 is double angled with a first portion adjacent the connecting portion 20 assuming an angle b of approximately 110° and a second portion terminating at the free end assuming an angle c relative to the first portion thereof of approximately 130°. The locking member is easily fabricated by stock material and support arm 26 is readily attached thereto by suitable and conventional welding techniques. It is presently preferred that angle d be approximately 140°. The seat is easily and readily attached by the pivot 30. The overall seat construction is light and simple in construction. The seat is adapted for use with a wide variety of different tree trunks or other generally vertical or nonvertical members. The padding or protective means 50 prevents damage to the tree trunk in use.

The present invention therefore provides a hunter, sportsman or camper with a readily transportable, easily usable seat which is adapted for use with a wide variety of trees. In view of the above description, those of ordinary skill in the art will undoubtedly envision various modifications which do not depart from the inventive concepts disclosed herein. For example, a ball type tilt swivel device could be substituted for the pivot structure 30 illustrated. Such a structure would still provide for relative movement of the seat platform 28 relative to the support arm 26. Also, the general configuration of the locking member 12 could be varied while not changing the manner of attachment of the locking member to the tree. Therefore, it is expressly intended that the above description should be considered as that of the preferred embodiment. The true spirit and scope of the present invention should be determined by reference to the appended claims.

The embodiments of the invention in which an exclusive property or privilege is claimed are defined as follows:

1. A portable seat adapted for use with a tree or like generally vertically extending member, said seat comprising:
   a mounting member having a first tree engaging portion and a spaced second tree engaging portion, said member dimensioned to at least partially encircle a tree with the first and second tree engaging portions abutting the tree on opposite sides thereof;
   a seat support arm extending outwardly from one of said portions;
   a seat member; and
   pivot and biasing means for pivotally securing said seat member to said seat support arm whereby said mounting member may be positioned around a tree with said first and second portions engaging opposite sides of the tree and the seat member may pivot relative to said seat support and assume a horizontal position relative to the ground.

2. A portable seat as defined by claim 1 further including a heat retaining member secured to the upper surface of said seat member.

3. A portable seat as defined by claim 2 wherein said mounting member is generally C-shaped and further including protective padding on said first and second tree engaging portions.

4. A portable seat as defined by claim 3 wherein said seat support extends outwardly at an angle greater than 90° relative to said mounting member.

5. A portable seat as defined by claim 4 further including resilient biasing means extending between said seat member and said seat support for biasing said seat member to a first position relative to said support member.

6. A portable tree seat adapted for use with vertical and nonvertical trees, said seat comprising:
   a seat platform having an upper surface and a lower surface;
   bracket means carrying said seat platform for securing said platform to a tree, said bracket means comprising a generally C-shaped locking member dimensioned to encircle a tree and having a first and second tree engaging portions, said portions engaging the tree on opposite sides thereof and a support member extending outwardly from one of said portions at an angle relative to said locking member which is greater than 90°;
   tilt and biasing means between said bracket means and said seat platform for permitting said platform to tilt freely relative to said bracket means and assume a horizontal position; and
   a protective covering on each of said first and second tree engaging portions to prevent damage to the tree.

7. A portable seat as defined by claim 6 wherein said tilt permitting means comprises:
   a generally L-shaped member having one leg secured to the undersurface of said seat platform and the other leg extending perpendicular to said seat;
   a pivot pin extending through said L-shaped member and said support member; and
   a spring extending between said support member and said L-shaped member.

8. A portable seat as defined by claim 7 further including a body heat retaining cover on the upper surface of said seat platform.

9. A portable seat as defined by claim 8 wherein the angle between said support member and said locking member is approximately 140°.

10. A portable seat as defined by claim 9 further including a resilient, detachable cord attached to one end of one of said tree engaging portions; and
   means for attaching said cord to the other of said tree engaging portions.

* * * * *